United States Patent
Azaz et al.

(10) Patent No.: US 12,217,333 B2
(45) Date of Patent: Feb. 4, 2025

(54) COLORS AS AN INTELLIGENT SERVICE

(71) Applicant: Microsoft Technology Licensing, LLC, Redmond, WA (US)

(72) Inventors: Hafsa Azaz, Redmond, WA (US); Bryan Allan Coard, Seattle, WA (US); Vikas Ajay Taskar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/878,892

(22) Filed: Aug. 1, 2022

(65) Prior Publication Data

US 2024/0037811 A1     Feb. 1, 2024

(51) Int. Cl.
| | | |
|---|---|---|
| *G06T 7/90* | (2017.01) | |
| *G06T 11/00* | (2006.01) | |
| *G06T 11/60* | (2006.01) | |
| *G06V 10/56* | (2022.01) | |
| *G06V 10/70* | (2022.01) | |
| *G06V 10/94* | (2022.01) | |

(52) U.S. Cl.
CPC .............. *G06T 11/001* (2013.01); *G06T 7/90* (2017.01); *G06T 11/60* (2013.01); *G06V 10/56* (2022.01); *G06V 10/70* (2022.01); *G06V 10/95* (2022.01); *G06T 2200/24* (2013.01)

(58) Field of Classification Search
CPC ......... G06T 11/001; G06T 7/90; G06T 11/60; G06T 2200/24; G06V 10/56; G06V 10/70; G06V 10/95
USPC .......................................................... 345/595
See application file for complete search history.

(56) References Cited

U.S. PATENT DOCUMENTS

| | | |
|---|---|---|
| 9,824,291 B2 | 11/2017 | Maloney et al. |
| 10,817,981 B1 * | 10/2020 | Belkin ...................... G06N 5/01 |
| 2018/0158128 A1 * | 6/2018 | Dorner ............... G06Q 30/0643 |
| 2022/0148227 A1 | 5/2022 | Echevarria Vallespi et al. |
| 2022/0230365 A1 * | 7/2022 | Bonfiglio .............. G06F 3/0481 |

OTHER PUBLICATIONS

Wastiels, et al., "Relating material experience to technical parameters: A case study on visual and tactile warmth perception of indoor wall materials", In Journal of Building and Environment, vol. 49, Mar. 1, 2012, pp. 359-367.
"International Search Report and Written Opinion Issued in PCT Application No. PCT/US23/027716", Mailed Date: Sep. 28, 2023, 11 Pages.

\* cited by examiner

*Primary Examiner* — Hai Tao Sun
(74) *Attorney, Agent, or Firm* — NovoTechIP International PLLC

(57) ABSTRACT

Systems and methods for providing color recommendations for content editing applications include receiving a color recommendation request from a content editing application that includes color information pertaining to a document being edited by the content editing application. At least one color is identified based on at least one of a predefined accessibility standard, predetermined telemetry data, and organizational/group preferences with reference to the color information in the color recommendation request using a color recommendation service. A color recommendation indicating the at least one identified color is provided from the color recommendation service to the content editing application.

17 Claims, 9 Drawing Sheets

COLORS AS AN INTELLIGENT SERVICE

BACKGROUND

When a user is creating and/or editing a document, color selection is an important factor in the overall design of the document as well as how the document is viewed by others. Documents having consistent color choices and smart use of color palettes are typically considered higher quality than documents with inconsistent and mismatched color choices. However, many users are not knowledgeable of how to identify suitable colors for with different content elements in a document. As a result, users may have to spend an inordinate amount of time in choosing color palettes and selecting appropriate colors for various elements of a document. In addition, some documents may be intended for viewing and/or consumption by users that have vision related difficulties, disabilities, and/or impairments. Users may not be aware of color guidelines, such as Web Content Accessibility Guidelines (WCAG), for selecting colors for content that can make the content more accessible to viewers that have vision impairments.

What is needed are systems and methods for recommending colors for use in content editing applications that does not require prior user knowledge or expertise.

SUMMARY

In one general aspect, the instant disclosure presents a data processing system having a processor and a memory in communication with the processor wherein the memory stores executable instructions that, when executed by the processor, cause the data processing system to perform multiple functions. The functions include receiving a color recommendation request from a content editing application, the color recommendation request including color information pertaining to a document being edited by the content editing application; identifying at least one color using a color selection machine learning (ML) model pretrained to select at least one color based on the color information in the request, the color selection ML model being trained using training data based on telemetry data generated by at least one user of content editing applications, the telemetry data indicating color choices in different contexts made by the at least one user, the color selection ML model being trained to receive the color information as input and output the at least one identified color; providing a color recommendation indicating the at least one color identified by the color selection ML model to the content editing application.

In yet another general aspect, the instant disclosure presents a data processing having a processor and a memory in communication with the processor wherein the memory stores executable instructions that, when executed by the processor, cause the data processing system to perform multiple functions. The functions include receiving a color recommendation request from a content editing application, the color recommendation request including color information pertaining to a document being edited by the content editing application; identifying at least one color using a color selection model pretrained to select at least one color using the color information as input and based on at least one of a predefined accessibility standard, predetermined telemetry data, and organizational/group preferences with reference to the color information in the color recommendation request using a color recommendation service; and providing a color recommendation indicating the at least one identified color from the color recommendation service to the content editing application.

In a further general aspect, the instant disclosure presents a data processing having a processor and a memory in communication with the processor wherein the memory stores executable instructions that, when executed by the processor, cause the data processing system to perform multiple functions. The functions include receiving a color recommendation request from a content editing application, the color recommendation request including color information pertaining to a document being edited by the content editing application; identifying at least one color based on at least one of a predefined accessibility standard, predetermined telemetry data, and organizational/group preferences with reference to the color information in the color recommendation request using a color recommendation service; and providing a color recommendation indicating the at least one identified color from the color recommendation service to the content editing application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
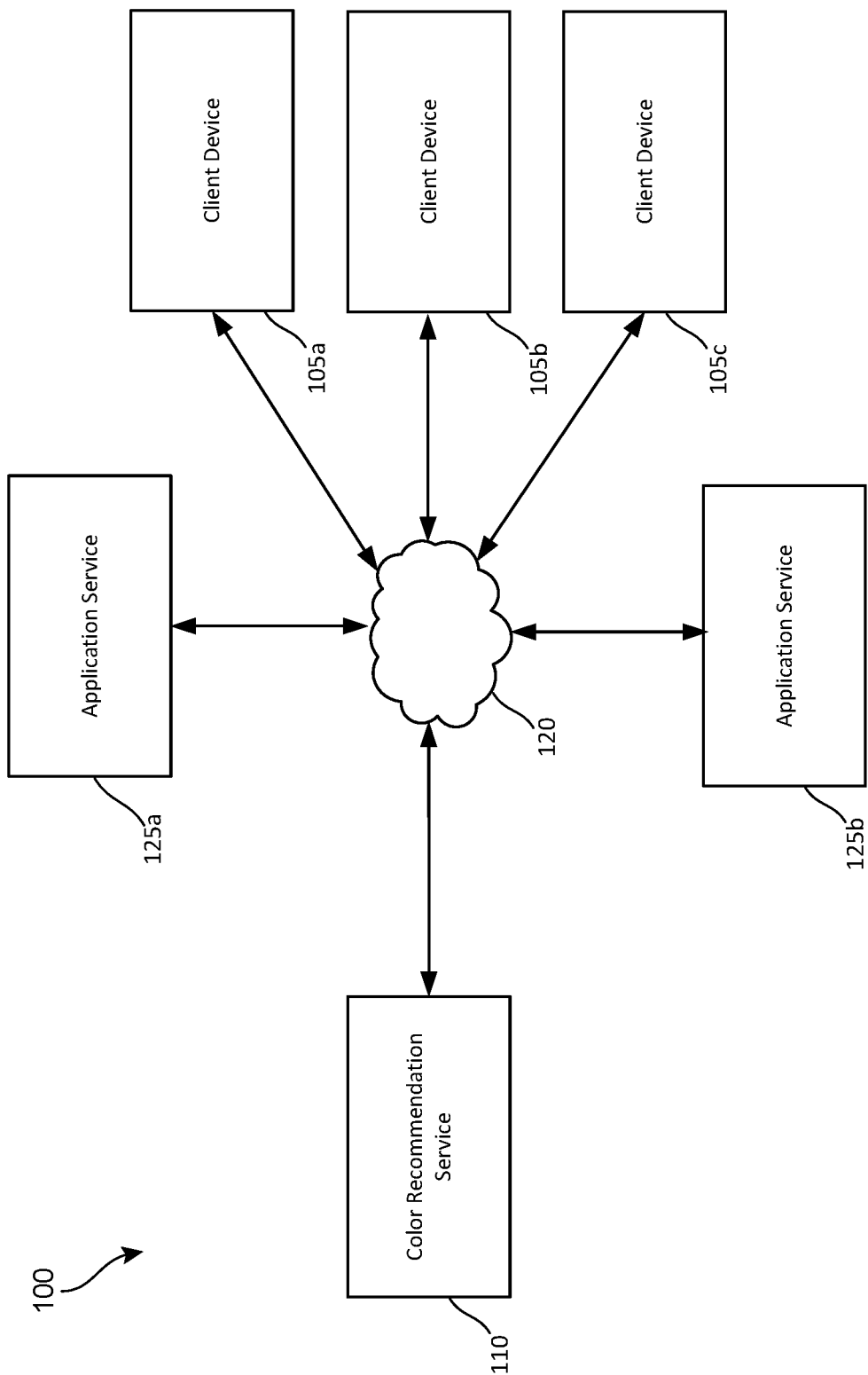
FIG. 1 is a diagram showing an example computing environment in which the techniques disclosed herein may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

As noted above, documents having consistent color choices and smart use of color palettes are typically considered higher quality than documents with inconsistent and mismatched color choices. However, many users are not knowledgeable of how to identify suitable colors for with different content elements in a document. As a result, users may have to spend an inordinate amount of time in choosing color palettes and selecting appropriate colors for various elements of a document. In addition, some documents may be intended for viewing and/or consumption by users that have vision related difficulties, disabilities, and/or impairments. Users may not be aware of color guidelines, such as Web Content Accessibility Guidelines (WCAG), for selecting colors for content that can make the content more accessible to viewers that have vision impairments.

To address these technical problems and more, in an example, this description provides technical solutions in the form of a color recommendation service for suggesting/recommending colors for use in content editing and/or creation applications, such as word processors, spreadsheet applications, presentation authoring applications, email clients, art applications, and the like. In accordance with one aspect of this disclosure, color recommendations may be made based on one or more accessibility standards, such as the Web Content Accessibility Guidelines (WCAG), that provide guidelines for selecting colors for web content that is more accessible to people with vision related difficulties, disabilities, and/or impairments. Color recommendations may also be based on color guidelines for making content more accessible to people with various types of color-blindness.

The technical solutions described herein address the technical problem of inefficiencies and difficulties in generating high quality visual content in documents by facilitating the selection of colors best suited for the document content as well as ensuring that documents meet accessibility standards so that all intended consumers of content, including those with visual impairments and difficulties, can view the content.

In accordance with another aspect of this disclosure, color recommendations may be based on telemetry data indicating past color choices made by users in creating and/or editing documents, color choices based on type of document being created/edited, color choices made based on other colors utilized in a document, and the like. Telemetry data may be used to identify frequently used color choices, color palettes, color usage patterns, and other color related data pertaining to creation and/or editing of content. In embodiments, user specific telemetry data may be used as the basis for recommending colors for use in a current document being created/edited by a user. In other embodiments, telemetry data from a plurality of users including other users of content editing applications is used as the basis for recommending colors of use in a current document being created/edited by a user.

The systems and methods described herein may utilize machine learning (ML) models to learn rules for recommending colors based on accessibility standards, telemetry data, and/or the like and apply these rules to color information from the current document to identify color recommendations for use in the document. In embodiments, color recommendations may be provided in real-time and may be reflected in the selectable color options that may be used to format content in the application. In some embodiments, color recommendations may be implemented by automatically formatting document content based on the color recommendations from the color recommendation service.

A technical benefit of the color recommendation service described herein is that documents and content may be created that satisfy accessibility standards without requiring a user to have knowledge of accessibility rules and/or guidelines. Another technical benefit of the color recommendation service is that consistent and appropriate color choices may be implemented in documents and content which improves the quality of the document and/or content without requiring user knowledge of color design, color palettes, and the like. Furthermore, the techniques herein generate color recommendations in substantially real-time to permit the user to obtain color recommendations for use within a document without introducing significant delays that interrupt the user workflow. Consequently, these techniques significantly improve the user experience.

FIG. 1 is a diagram showing an example computing environment 100 in which the techniques disclosed herein for generating color recommendations for use in electronic documents may be implemented. The computing environment 100 includes a color recommendation service 110. The example computing environment 200 may also include client devices 105a, 105b, and 105c (collectively referred to as client device 105) and application services 125a and 125b (collectively referred to as application service 225). The client devices 105a, 105b, and 105c may communicate with the color recommendation service 110 and/or the application service 125 via the network 120. The network 120 may be a combination of one or more public and/or private networks and may be implemented at least in part by the Internet.

In the example shown in FIG. 1, the color recommendation service 110 is implemented as a cloud-based service or set of services. The color recommendation service 110 is configured to receive requests for color recommendations from a client device 105 or an application service 125. As discussed below, the request includes various items of information that may be used by the color recommendation service to generate color recommendations for use in creating and/or editing a document. The client device 105 or the application service 125 receives the color recommendation from the color recommendation service 110 and presents the color recommendation to a user via an application.

The application services 125a and 125b provide cloud-based software and services that are accessible to users via the client devices 105a, 105b, and 105c. The application services 125a and 125b may include various types of applications, including content editing applications which provide functionality for users to consume, create, share, collaborate on, and/or modify various types of electronic content, such as but not limited to textual content, imagery, presentation content, web-based content, forms and/or other structured electronic content, and other types of electronic content. The application services 125a and 125b may provide functionality for users to collaborate on the creation of the electronic content. The application services 125*a* and 125*b* may also provide a communication platform for users to communicate via email, text messages, audio and/or video streams as part of a communication session.

The application services 125*a* and 125*b* and/or the client devices 105*a*, 105*b*, and 105*c* may submit requests and textual or multimodal inputs to obtain color recommendations for use in creating and/or editing electronic documents on the client devices 105*a*, 105*b*, and 105*c*. The requests may include information that identifies the user for whom the abstract images are to be provided to determine whether the user is authorized to use the services provided by the color recommendation service 110. The example implementations which follow demonstrate how these requests may be processed and color recommendations generated by the color recommendation service 110 and presented to a user of the client devices 105*a*, 105*b*, and 105*c*.

The client devices 105*a*, 105*b*, and 105*c* are each a computing device that may be implemented as a portable electronic device, such as a mobile phone, a tablet computer, a laptop computer, a portable digital assistant device, a portable game console, and/or other such devices. The client devices 105*a*, 105*b*, and 105*c* may also be implemented in computing devices having other form factors, such as a desktop computer, vehicle onboard computing system, a kiosk, a point-of-sale system, a video game console, and/or other types of computing devices. While the example implementation illustrated in FIG. 1 includes three client devices, other implementations may include a different number of client devices that may utilize the application service 125 and/or the color recommendation service 110. Furthermore, in some implementations, the application functionality provided by the application service 125, such as content editing applications, may be implemented by a native application installed on the client devices 105*a*, 105*b*, and 105*c*, and the client devices 105*a*, 105*b*, and 105*c* may communicate directly with the color recommendation service 110 over a network connection.

In the example shown in FIG. 1, the color recommendation service 110 is shown as a cloud-based service that may be accessed over a network. However, other implementations of the color recommendation service 110 may be achieved by the application service 125 and/or by the client devices 105*a*, 105*b*, and 105*c*. In other implementations, the functionality of the color recommendation service 110 and/or the application service 125 described herein may be carried out on the client devices 105*a*, 105*b*, and 105*c*.

Figure 2:
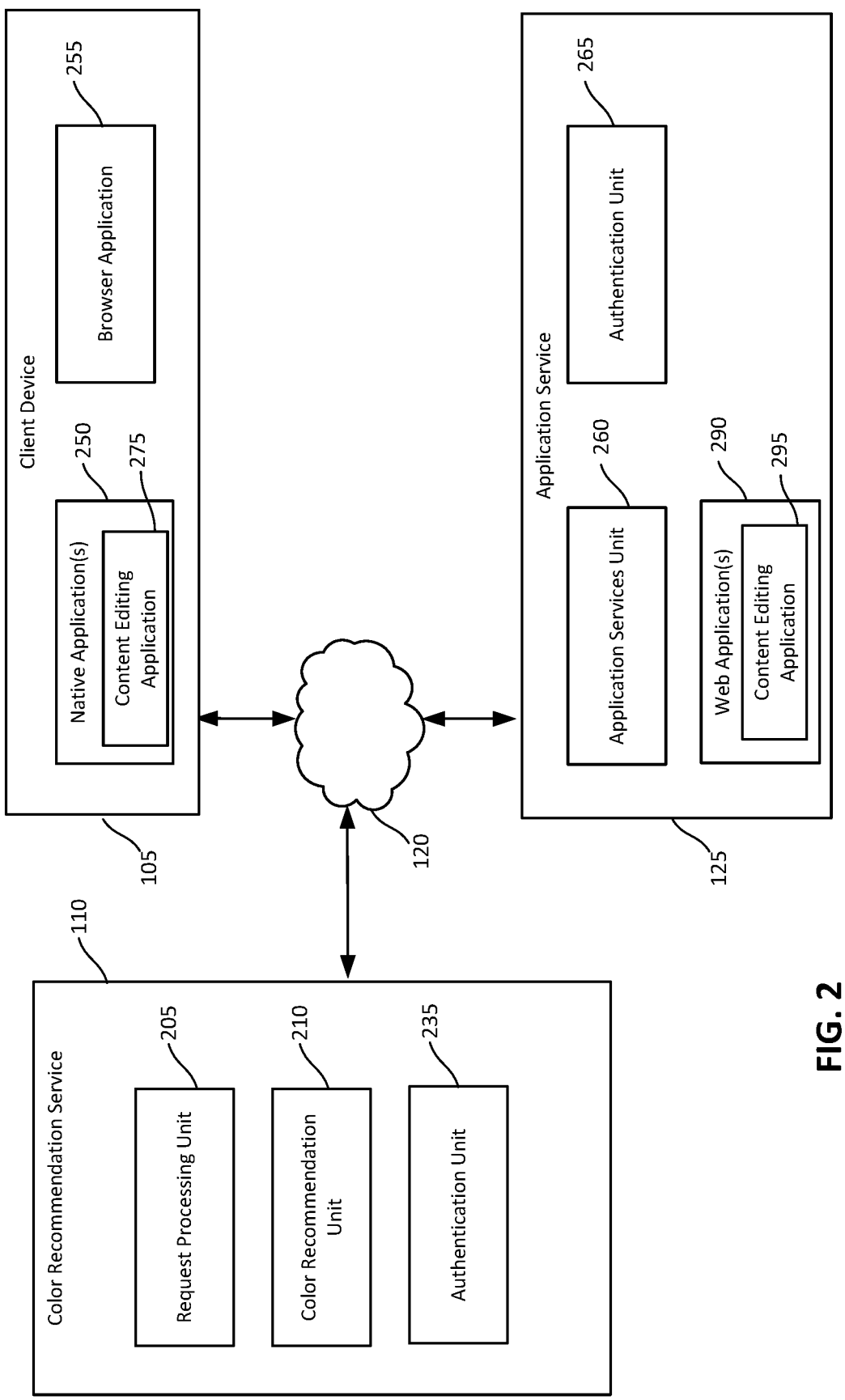
FIG. 2 is an example architecture that may be used, at least in part, to implement the client devices, the application services, and the color recommendation service shown in FIG. 1.

FIG. 2 is a diagram showing additional features of the color recommendation service 110, the client device 105, and the application service 125. The application service 125 includes an application services unit 260 and/or an authentication unit 265. The application services unit 260 provides means for users to consume, create, share, collaborate on, and/or modify various types of electronic content. The application services unit 260 may provide a web-based interface to enable users to access at least a portion of the services provided by the application service 125. In some implementations, the application service 125 provides web applications 290. Web applications may include a content editing application 295 that enables users to consume, create, share, collaborate on, and/or modify content using the browser application 255.

The authentication unit 265 may provide means for verifying whether users are permitted to access the services provided by the application service 225 and/or color recommendation service 210. The authentication unit 265 may provide means for receiving authentication credentials for the users from their respective client device 105. The authentication unit 265 may be configured to verify that the authentication credentials are valid and permit the users to access the services provided by the application service 225 and/or the color recommendation service 110 responsive to the authentication credentials being valid.

The client device 105 includes one or more native applications 250 and/or a browser application 255. The one or more native applications 250 include a content editing application 275 developed for use on the client device 105 to enable users to consume, create, share, collaborate on, and/or modify electronic content. The browser application 255 may be an application for accessing and viewing web-based content. In some implementations, the browser application 255 may be used to access the web application 290 (including the content editing application 295) and render a user interface for interacting with the application service 125 in the browser application 255. The application service 225 and/or the color recommendation service 110 support both the one or more web-enabled native applications 250 (including the content editing application 275) and the one or more web applications 290 (including the content editing application 295) in some implementations, and users may choose which approach best suits their needs.

The content editing applications mentioned above include word processors, spreadsheet applications, presentation authoring applications, email clients, art/drawing applications, and the like. The term "electronic document" as used herein can be representative of any document or component in electronic form that can be created by a computing device, stored in a machine-readable storage medium, and/or transferred among computing devices over a network connection or via a machine-readable storage medium. Examples of such electronic documents include but are not limited to word processing documents, presentations, spreadsheets, websites (e.g., SharePoint sites), digital drawings, media files, text and/or multimedia messages, or components thereof, and the like. In some implementations, the color recommendation service 110, or at least a portion of the functionality thereof, is implemented by the application service 125 or the client device 105 to generate color recommendations for use in creating or editing electronic documents.

The color recommendation service 110 includes a request processing unit 205, an image generation unit 210, and an authentication unit 235. The authentication unit 235 provides functionality for verifying whether users are permitted to access the services provided by the color recommendation service 110. In some implementations, the authentication unit 235 provides functionality for receiving authentication credentials for users from their respective client device 105 or from the application service 125. The authentication unit 235 may be configured to verify that the authentication credentials are valid and permit the users to access the services and/or documents provided by the color recommendation service 110 responsive to the authentication credentials being valid.

The request processing unit 205 is configured to receive requests for color recommendations from applications, such as the content editing applications 275, 295. The request for color recommendations includes parameter information for use by the color recommendation unit 210 to facilitate and/or guide color recommendations. Examples of parameter information that may be included in a request include color parameter information. Color parameter information includes information identifying at least one color of a content element (e.g., background, foreground, text, image, and the like) in an electronic document for which a color recommendation is being requested. In embodiments, color parameter information may include color information identifying all colors used in the document as well as information identifying types of elements (e.g., background, foreground, text, image, and the like) that the colors are associated with. In embodiments, parameter information for requests may also include user information identifying a user requesting the color recommendation. As discussed below, this information may be used to identify telemetry information pertaining to the user that may be used in generating color recommendations. The parameter information pertaining to the document itself, such as type of document, type of content in document. In embodiments, the electronic document itself may be provided for analysis by the color recommendation unit 210 to generate color recommendations for use with the electronic document. In embodiments, parameter information may also indicate a type of recommendation requested, such as color accessibility recommendation, personalized color recommendations, organizational/group color recommendations, and the like.

In embodiments, client editing applications, such as applications 275, 295 may include a user interface that enables a user to provide input indicating of the parameter information for the request. For example, in embodiments, various types of user controls, such as text inputs, buttons, selectable options, and the like, may be provided on the user interface to provide information to be included in the request. In embodiments, the formatting and methods of communicating requests to the color recommendation service and receiving color recommendations from the color recommendation service may be defined by an application programming interface (API).

The request processing unit 205 is configured to receive color recommendation requests and to process the color recommendation requests to retrieve the parameter information pertaining to the request. The request processing unit 205 is configured to provide the parameter information to the color recommendation unit 210. The color recommendation unit 210 is configured to process the parameter information to generate color recommendations (described in more detail below). The request processing unit then provides the color recommendations to the application which transmitted the request. In embodiments, the color recommendations obtained from the color recommendation service 110 identify at least one color, color group, or palette recommended for use with the electronic document and/or for use with content element(s) of the documents (e.g., background, foreground, text elements, images, and the like). In embodiments, color recommendation information identifies colors that are recommended not to be used in the document or for certain elements within the document. Color recommendations may be presented to a user via a content editing application in a number of ways. For example, in some embodiments, color recommendations are used to filter selectable color options provided in content editing applications. Recommended colors may be displayed with visual indicators, such as highlighting and/or different colored outlines, indicating that the colors are recommended by the color recommendation service. Alternatively, colors not being recommended by the color recommendation service 110 may be omitted as selectable color options or displayed in a manner indicating that they are not available for selection, e.g., by "graying out" the option. In some embodiments, color recommendations are implemented automatically in the document by coloring content elements in accordance with the color recommendations from the color recommendation service. In embodiments, color recommendations may be provided to the content editing application in real-time so that color recommendations may be reflected in the content editing application as the user is editing a document.

Figure 3:
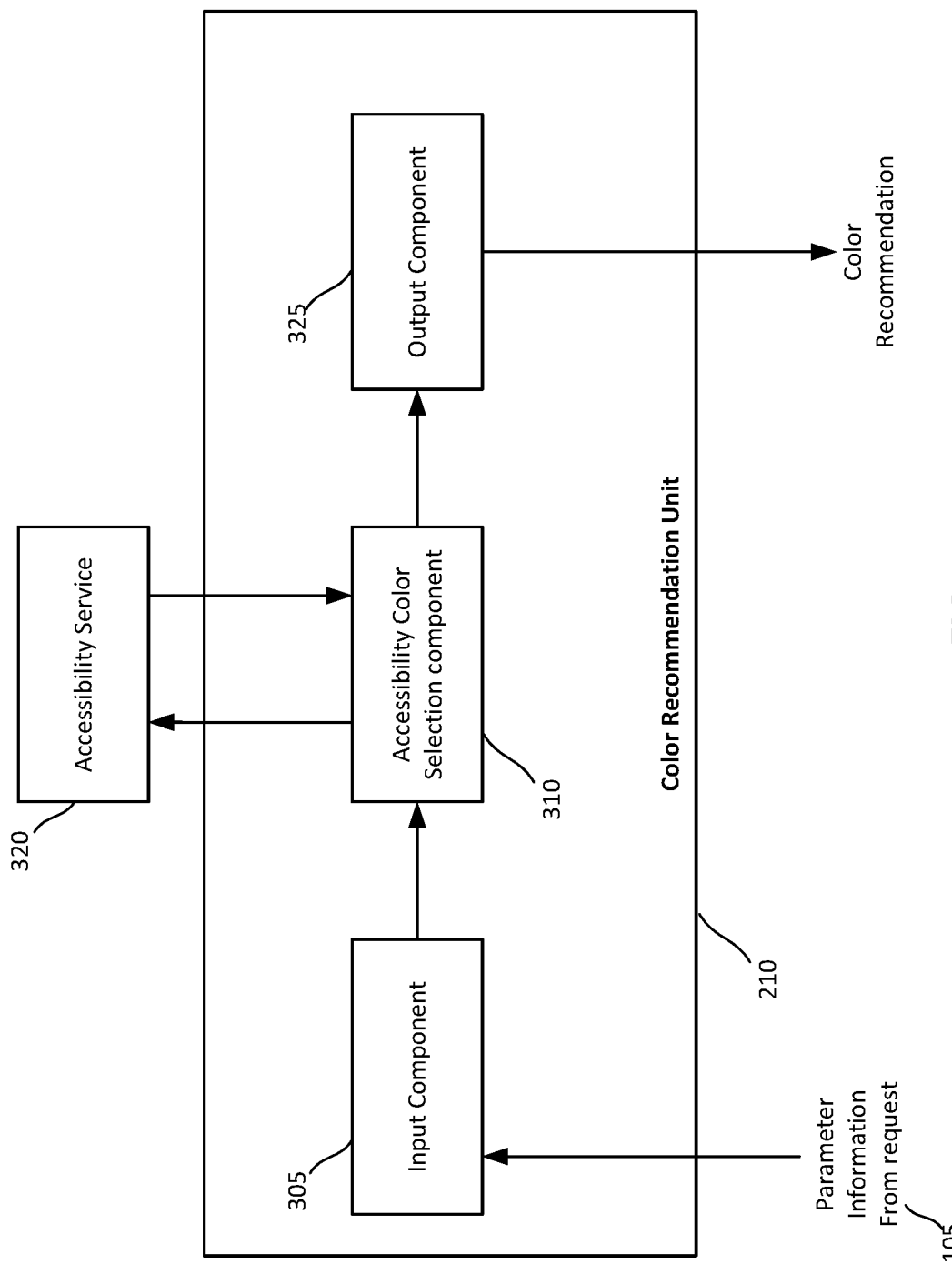
FIG. 3 shows an embodiment of a color recommendation service which is configured to recommend colors that satisfy at least one selected accessibility standard.

The color recommendation unit 210 is configured to generate color recommendations based on one or more factors. In accordance with one aspect of the disclosure, the color recommendation unit 210 is configured to provide color recommendations that satisfy one or more accessibility standards. FIG. 3 shows an example implementation of a color recommendation unit 210 for recommending colors based on accessibility concerns. In this example implementation, the color recommendation unit includes an input component 305, an accessibility color selection component 310, an accessibility service 315, and an output component 325.

The input unit 305 is configured to receive parameter information, e.g., from the requesting processing unit 205. In this embodiment, the parameter information identifies at least one color pertaining to an electronic document for which a color recommendation has been requested. The parameter information may also include information identifying a content element or type of content element to which the color information applies. In embodiments, the parameter information may indicate a color of a background, background region, or background element of a document, may indicate a color of a foreground element (e.g., text element, image, graphic, etc.) of a document, or a background and foreground color pair. The input unit 305 may be configured to reformat the parameter information into a format that may be utilized as input for one or more other components of the color recommendation unit, such as the color selection component 310 and/or application services 320.

The input component 305 provides parameter information for the request to the accessibility color selection component 310. In embodiments, the accessibility color selection component 310 is configured to provide color information to the accessibility service 320. accessibility service is configured to process the input color to determine other colors choices that may be used with the input color to satisfy at least one accessibility standard/requirement. In embodiments, the accessibility service is configured to select colors that satisfy the standard set by the Web Content Accessibility Guidelines (WCAG) which provides guidance for selecting colors based a predefined contrast threshold between foreground and background color pairs. Other accessibility standards can be utilized for recommending colors to facilitate viewing by people having different types of color blindness, or other color-based vision impairments. In embodiments, accessibility service receives an input color and identifies color for use with the input color that satisfy the selected accessibility standard. In embodiments, colors that satisfy accessibility requirements may be identified in any suitable manner. For example, accessibility service may be configured programmatically to implement a formula that determines contrast values for colors with respect to the input color. The contrast values for the colors may then be compared to a predefined threshold value for the contrast values to identify colors that satisfy the accessibility requirement with respect to the input color. These identified colors are then used as the output colors for the color recommendations.

In any case, the colors identified by the accessibility service that satisfy the accessibility requirements with respect to an input color are output to the accessibility color selection component. The accessibility color selection component provides the identified colors to the output component 325. The output component 325 is configured to generate a color recommendation that includes the identified colors which may then be transmitted to the requesting application. In embodiments, the color recommendation is formatted according to a predefined API.

Figure 4:
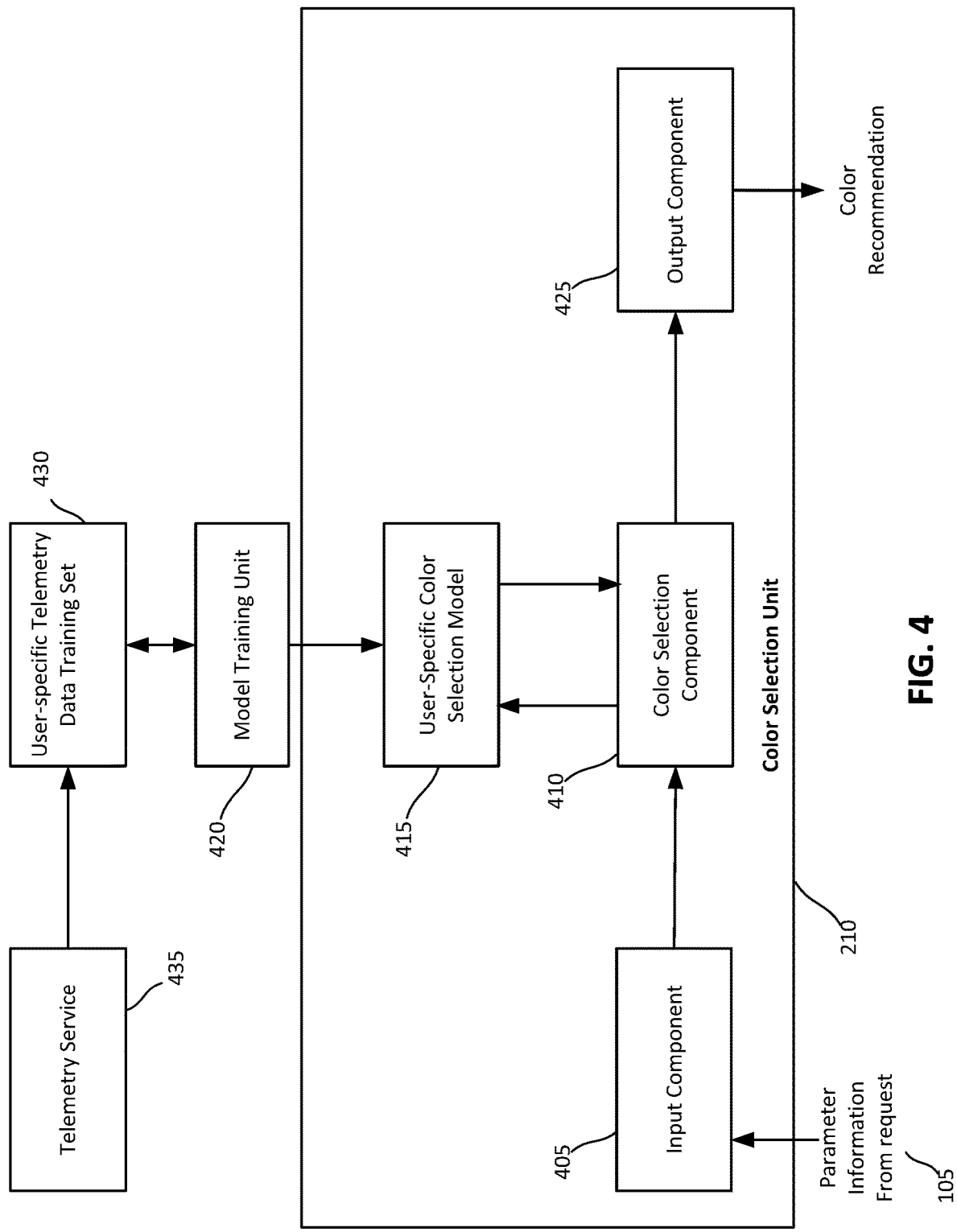
FIG. 4 shows an embodiment of a color recommendation service which is configured to recommend colors based on user-specific telemetry data.

In accordance with another aspect, the color recommendation service is configured to provide color recommendations based on telemetry data. FIG. 4 shows an example implementation of a color recommendation service for recommending colors based on telemetry data. To this end, the color recommendation service of FIG. 4 includes a telemetry service 435 for tracking and collecting user telemetry data. The user telemetry data includes past color choices and selections made by a user in interacting with various content editing applications, color choices based on type of document being created/edited, color choices made based on other colors utilized in a document, and the like. User specific telemetry data may be used to identify frequently used color choices, color palettes, color usage patterns, and other color related data pertaining to a user. Telemetry data may be collected in any suitable manner. In embodiments, telemetry data may be communicated to telemetry service by content editing applications, such as applications 275, 295. Telemetry service 435 may store telemetry data for a plurality of users of the content editing applications. In embodiments, telemetry data may be stored in association with user identification information which identifies the users to which the telemetry data pertains and may be used to access telemetry data pertaining to certain users.

The color selection unit 210 of FIG. 4 includes an input component 405 and an output component 425 which may correspond substantially to the input and output components 305, 325 of FIG. 3. In the embodiment of FIG. 4, the color selection component is configured to generate color recommendations based on user specific telemetry data. In embodiments, color recommendations based on user specific preference data are generated using a user-specific color selection model 415 which is a machine learning (ML) model. In embodiments, the user-specific color selection model 415 is trained by a model training unit 420 using a user-specific telemetry training data 430 derived from telemetry data 435 which may be retrieved from telemetry service 435. In embodiments, the model 415 is trained to learn rules for identifying colors to recommend to a user based on past color choices and context information pertaining to the user's color choices from the user's telemetry data and apply these rules to the user's color choices, color patterns, color palette, and the like in the current document. In embodiments, rules may be learned to determine a "tone/sentiment" pertaining to the document based on the colors or color palette currently utilized in the document. Color recommendations may then be made based on the determined tone/sentiment of the document. The training data 430 for the user-specific color selection model may be occasionally updated based on new user telemetry data and the model may be retrained and/or new models may be generated so that color recommendations based on user-specific preferences are based on current user preferences.

In embodiments, parameter information may include color information identifying at least one color current used in a document being edited as well and/or user information pertaining to a user editing the document. The color selection component 410 supplies the color information and/or the user information to the user-specific color selection model which applies pre-learned rules to the inputs to identify colors to be recommended to the user for use in the document. The identified colors are provided to the output component 425 which formats a color recommendation including the identified colors which is then provided to the application requesting the color recommendation. In embodiments, color recommendations may be continually updated by providing current color choices and selections utilized in a document being edited to the color selection unit so that color recommendations may be generated substantially in real-time for use in editing the document.

Figure 5:
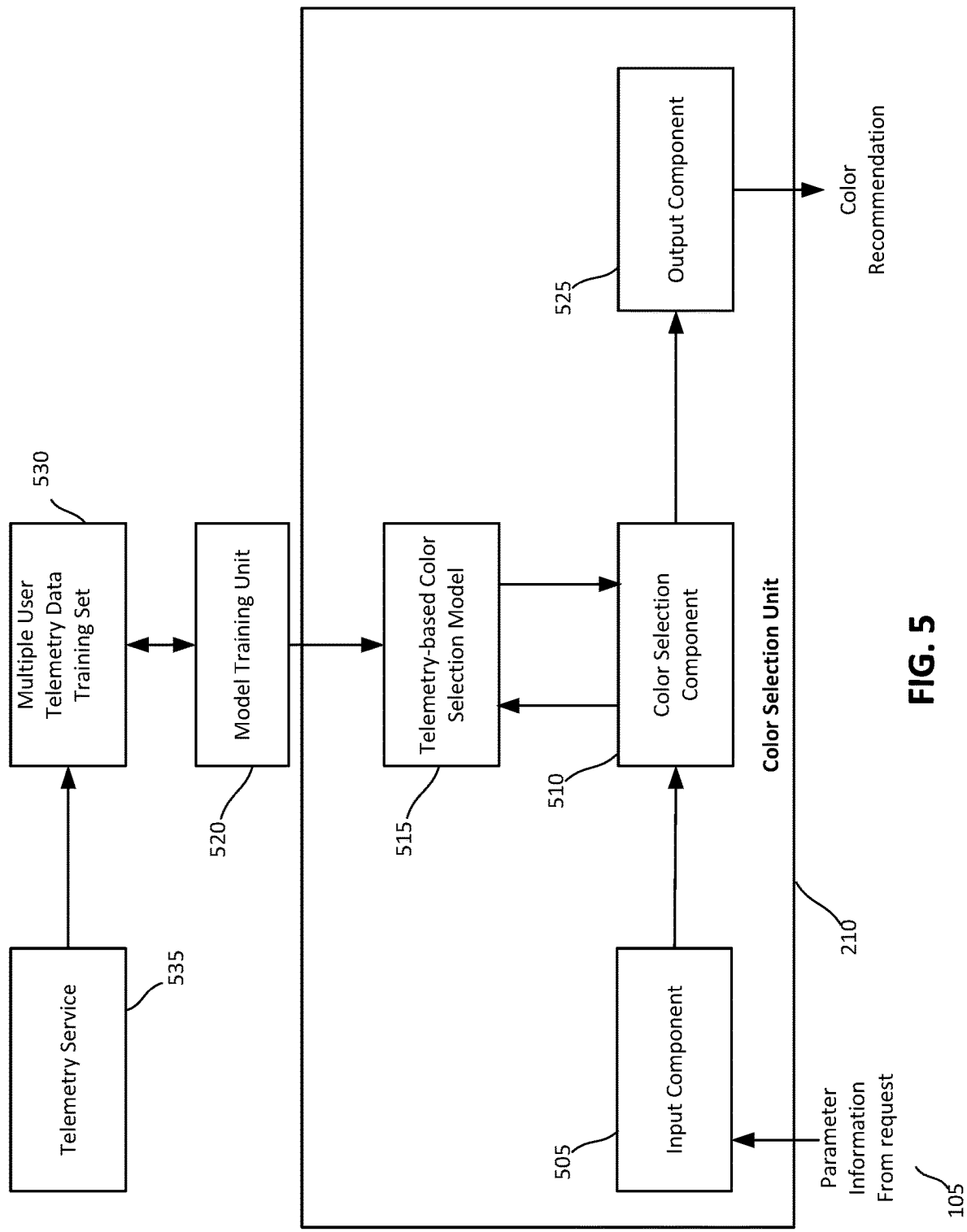
FIG. 5 shows an embodiment of a color recommendation service which is configured to recommend colors based on telemetry data for a plurality of users of content editing applications.

In another aspect, color recommendation service is configured to make color recommendations based on telemetry data from multiple users of the same or similar content editing applications. Referring to FIG. 5, in embodiments, telemetry service 535 is configured to track and collect telemetry data pertaining to a plurality of users (and in some cases, all users) of one or more content editing applications. As with user-specific telemetry data, telemetry data for other users includes past color choices and selections made in interacting with various content editing applications, color choices based on type of document being created/edited, color choices made based on other colors utilized in a document, and the like. Telemetry data from the plurality of users is used to identify frequently used color choices, color palettes, color usage patterns, and other color related data that may be used as the basis for making recommendations to the current user. Multiple user telemetry data may used to generate a training data set 530. A model training unit 520 may be configured to train a telemetry-based color selection model 515 which is an ML model. In embodiments, telemetry-based selection model 515 is trained to learn rules for identifying colors to recommend to a user based on the color choices and context information pertaining to a plurality of users of content editing applications and apply these rules to the color choices, color patterns, color palettes, and the like in the current document. In embodiments, rules may be learned to determine a "tone/sentiment" pertaining to the document based on the colors or color palette currently utilized in the document. Color recommendations may then be made based on the determined tone/sentiment of the document. The training data for the telemetry-based selection model 515 may be occasionally updated based on new user telemetry data and the model may be retrained and/or new models may be generated so that color recommendations based on user-specific preferences are based on current user preferences.

Identified colors are provided to the output component 525 which formats a color recommendation including the identified colors which is then provided to the application requesting the color recommendation. In embodiments, color recommendations may be continually updated by providing current color choices and selections utilized in a document being edited to the color selection unit so that color recommendations may be generated substantially in real-time for use in editing the document.

Figure 6:
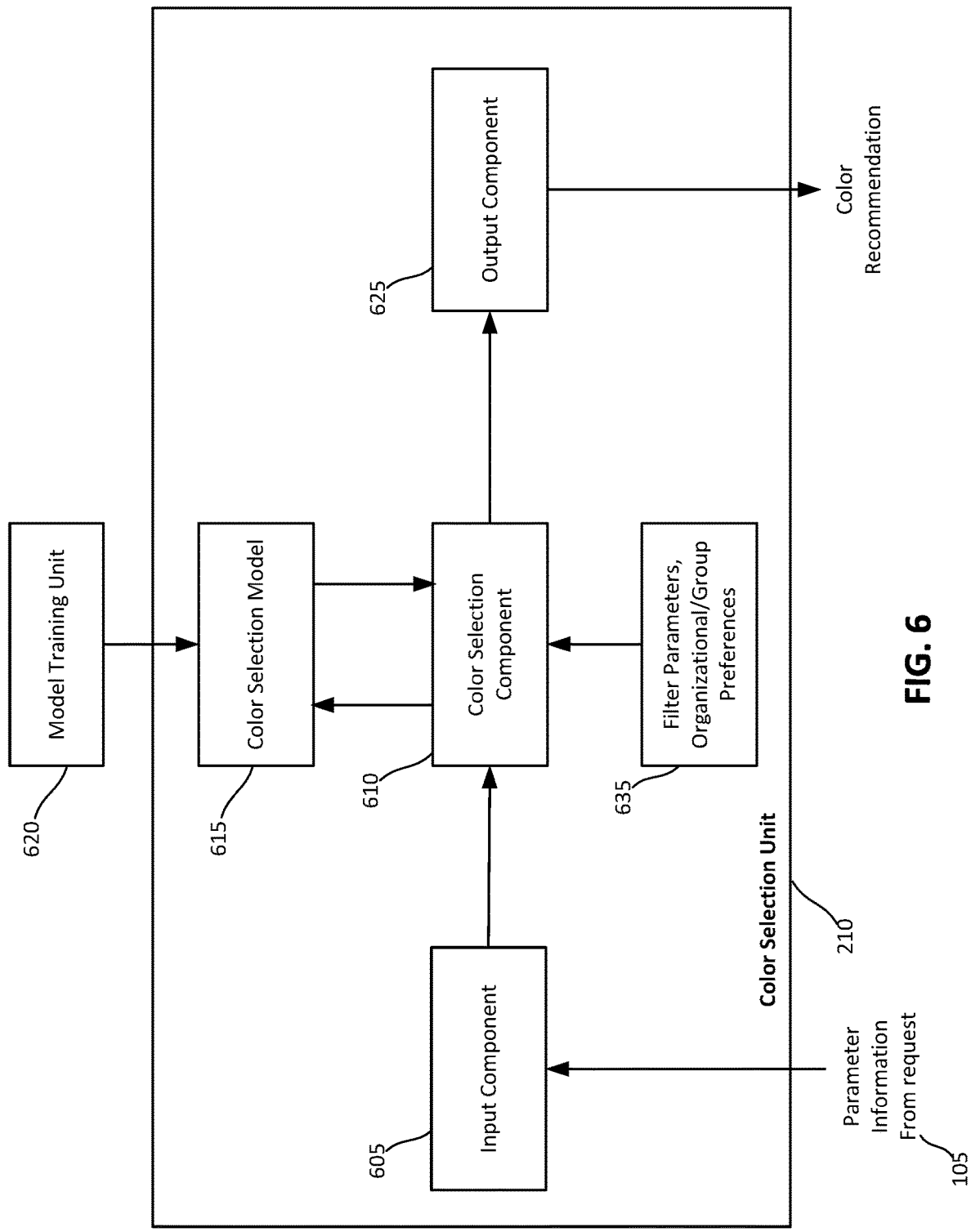
FIG. 6 shows an embodiment of a color recommendation service which uses organizational/group preferences to filter color recommendations.

In embodiments, color selection unit may be configured to utilize other factors in determining colors to provide as recommendations for a particular document and/or user. For example, in embodiments, parameters, such as organizational/group preferences may be utilized as filter parameters for filtering colors selected to be recommended for use in a particular document. Referring to FIG. 6, an embodiment of a color selection unit for generating color recommendations based at least in part on filter parameters, such as organizational/group preferences is shown. In FIG. 6, the input component 605 receives parameter information pertaining to a color recommendation request. The color selection component 610 provides parameter information to a color selection model, which may be a user-specific color selection model, a telemetry-based color selection model, or other kind of model configured to generate color recommendations based on input parameters pertaining to a color recommendation request. The color selection model 615 identifies color to recommend for use in a document. The color selection component 610 is configured to apply filter parameters 635 to the identified colors to filter the identified colors based on predefined preferences, such as organizational/group preferences so that only colors that satisfy the organizational/group preferences are provided as recommendations for a document. For example, organizations, groups, workplaces, and similar entities with which a user may be affiliated may have color preferences for use in documents and document content. These preferences may be used as filter parameters to eliminate colors that do not conform to the preferences. A filtered color list may then be provided to the output component 625 to provide in a color recommendation.

Figure 7:
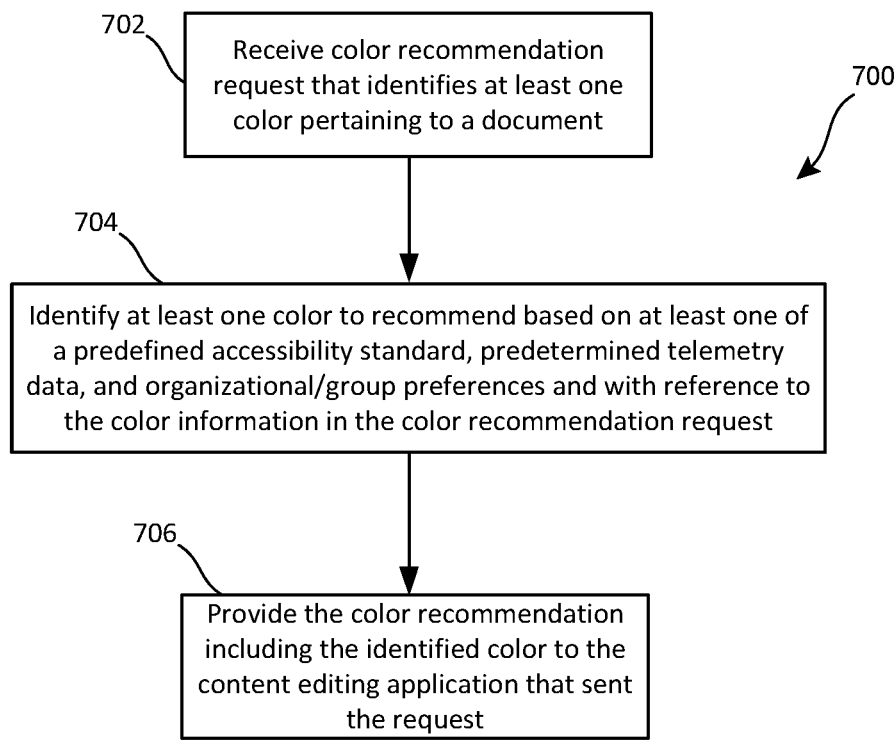
FIG. 7 is a flowchart of a method for recommending colors for use in a content editing application in accordance with this disclosure.

FIG. 7 is a flowchart an example method 700 for a color recommendation service. The method begins with receiving a color recommendation request from a content editing application that includes color information pertaining to a document being edited by the content editing application (block 702). At least one color is then identified based on at least one of a predefined accessibility standard, predetermined telemetry data, and organizational/group preferences with reference to the color information in the color recommendation request using a color recommendation service (block 704). A color recommendation indicating the at least one identified color is then provided from the color recommendation service to the content editing application (block 706).

Figure 8:
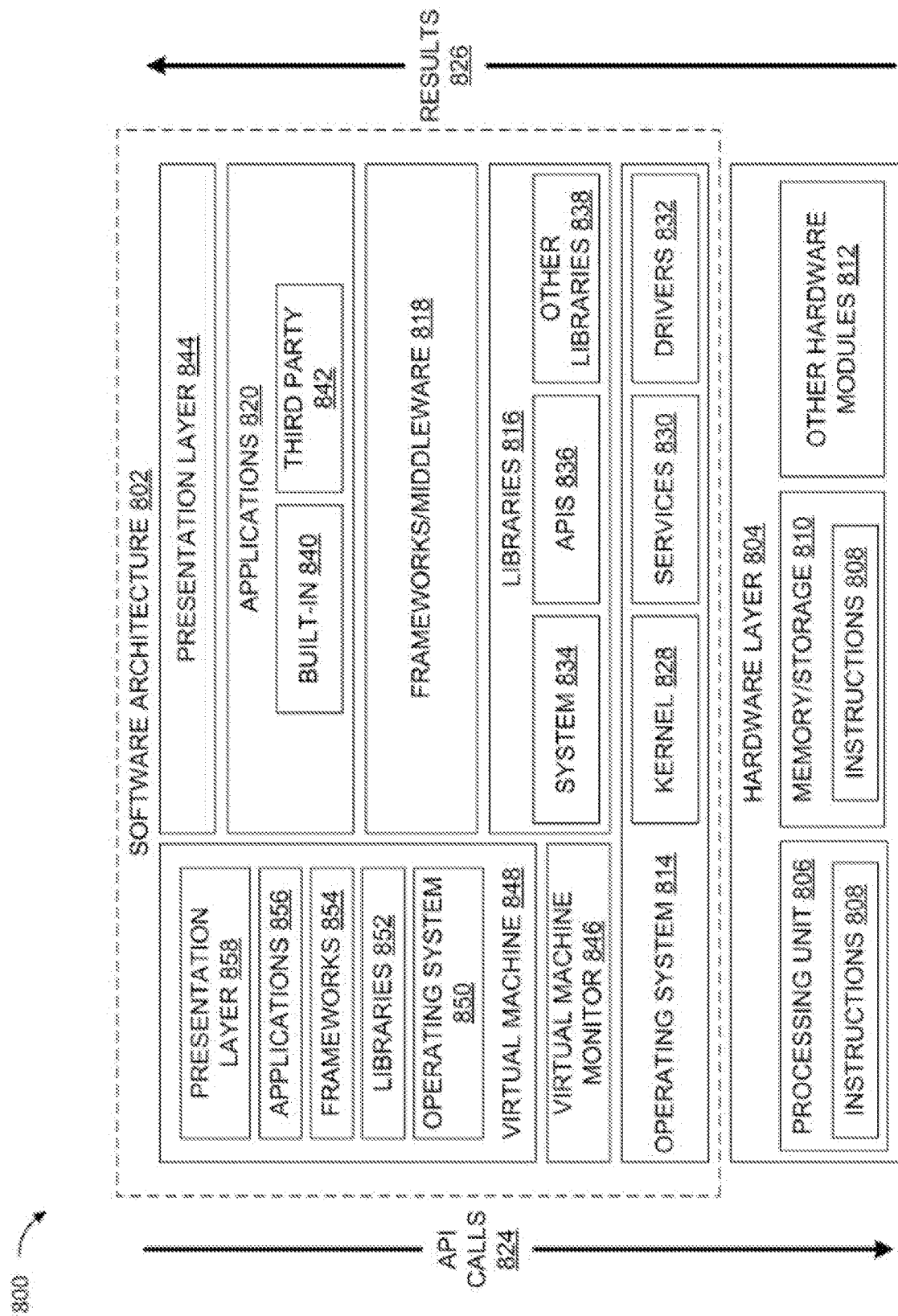
FIG. 8 is a block diagram illustrating an example software architecture, various portions of which may be used in conjunction with various hardware architectures herein described.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
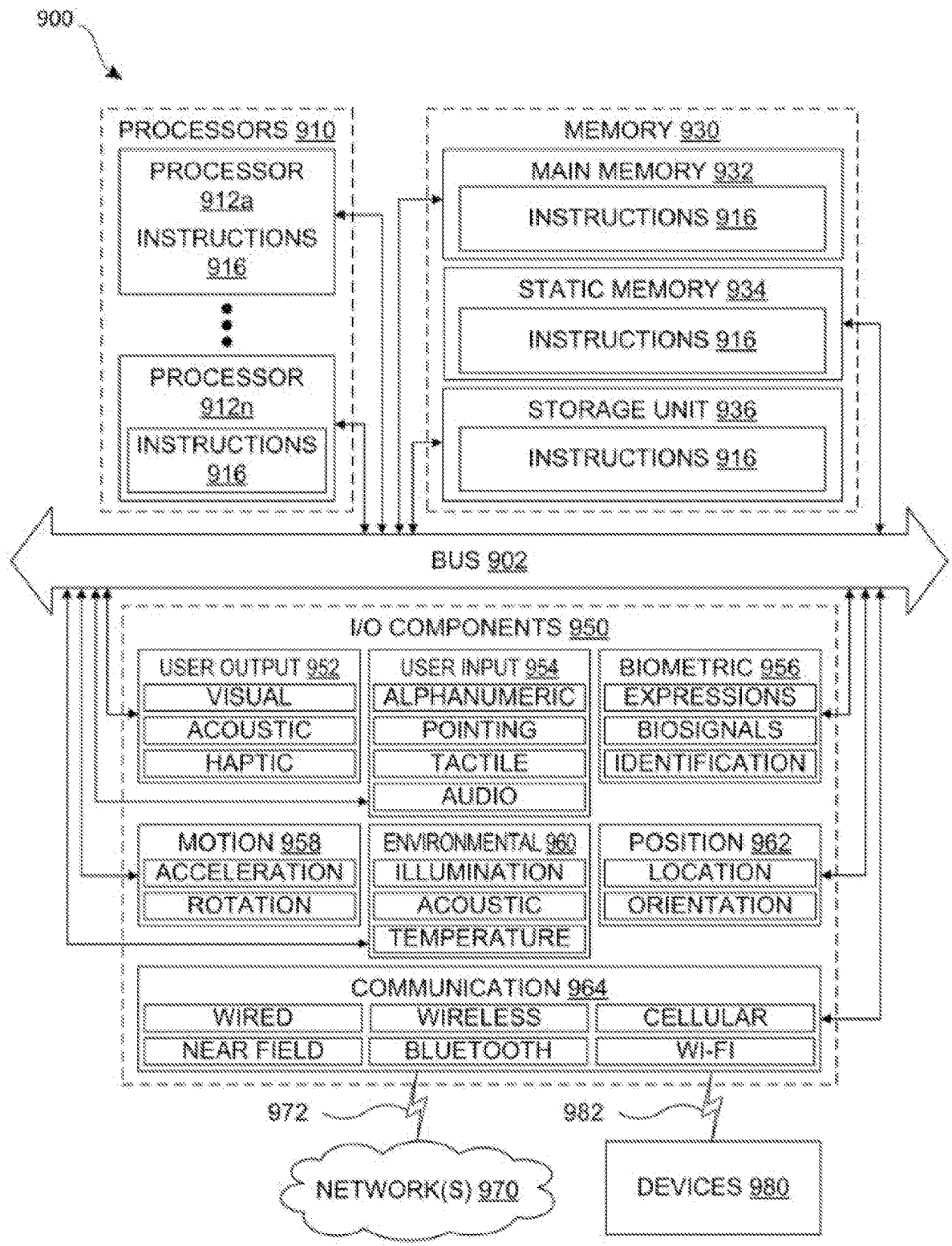
FIG. 9 is a block diagram illustrating components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1. A data processing system comprising:
  a processor; and
  a memory in communication with the processor, the memory comprising executable instructions that, when executed by the processor, cause the data processing system to perform functions of:
    receiving a color recommendation request from a content editing application, the color recommendation request including color information pertaining to a document being edited by the content editing application;
    identifying at least one color using a color selection machine learning (ML) model pretrained to select at least one color based on the color information in the request, the color selection ML model being trained using training data based on telemetry data generated by at least one user of content editing applications, the telemetry data indicating color choices in different contexts made by the at least one user, the color selection ML model being trained to receive the color information as input and output the at least one identified color;
    providing a color recommendation indicating the at least one color identified by the color selection ML model to the content editing application.

Item 2. The data processing system of claim 1, wherein the predetermined telemetry data includes user-specific telemetry data pertaining to past color choices made by a current user of the content editing application, and wherein the color selection ML model is trained to learn rules for identifying the at least one color for the color recommendation based on the user-specific telemetry data.

Item 3. The data processing system of any of any of claims 1-2, wherein the telemetry data includes telemetry data pertaining to past color choices made by a plurality of users of content editing applications, and wherein the color selection ML model is trained to learn rules for identifying the at least one color for the color recommendation based on the telemetry data for the plurality of users.

Item 4. The data processing system of any of any of claims 1-4, further comprising:
  using the color recommendation in the content editing application to limit selectable colors for use in editing content in the document.

Item 5. The data processing system of any of any of claims 1-5, further comprising:
  automatically applying the at least one identified color in the color recommendation to at least one content element in the document.

Item 6. The data processing system of any of any of claims 1-6, further comprising:
  using organizational/group preferences as filter parameters to filter the identified at least one color such that only colors that satisfy the organizational/group preferences are provided in the color recommendation.

Item 7. The data processing system of any of any of claims 1-7, further comprising:
  identifying the at least one color such that the at least one color satisfies a preselected accessibility standard with respect to the color information from the request.

Item 8. A data processing system comprising:
  a processor; and
  a memory in communication with the processor, the memory comprising executable instructions that, when executed by the processor, cause the data processing system to perform functions of:
    receiving a color recommendation request from a content editing application, the color recommendation request including color information pertaining to a document being edited by the content editing application;
    identifying at least one color using a color selection model pretrained to select at least one color using the color information as input and based on at least one of a predefined accessibility standard, predetermined telemetry data, and organizational/group preferences with reference to the color information in the color recommendation request using a color recommendation service; and
    providing a color recommendation indicating the at least one identified color from the color recommendation service to the content editing application.

Item 9. The data processing system of claim 8, wherein identifying the at least one color includes identifying the least one color based on the predefined accessibility standard, and
 wherein the predefined accessibility standard includes a Web Content Accessibility Guideline (WCAG) standard.
Item 10. The data processing system of any of claims 8-9, wherein identifying the at least one color includes identifying the least one color based on the predetermined telemetry data,
 wherein the predetermined telemetry data includes user-specific telemetry data pertaining to past color choices made by a current user of the content editing application, and
 wherein the at least one color is identified using the color selection model trained to learn rules for identifying the at least one color for the color recommendation based on the user-specific telemetry data.
Item 11. The data processing system of any of claims 8-10, wherein identifying the at least one color includes identifying the least one color based on the predetermined telemetry data,
 wherein the predetermined telemetry data includes telemetry data pertaining to past color choices made by a plurality of users of content editing applications, and
 wherein the at least one color is identified using a color selection model trained to learn rules for identifying the at least one color for the color recommendation based on the telemetry data for the plurality of users.
Item 12. The data processing system of any of claims 8-11, further comprising:
 using the color recommendation in the content editing application to limit selectable colors for use in editing content in the document.
Item 13. The data processing system of any of claims 8-13, further comprising:
 automatically applying the at least one identified color in the color recommendation to at least one content element in the document.
Item 14. The data processing system of any of claims 8-13, wherein identifying the at least one color includes identifying the least one color based on the predetermined telemetry data, and
 wherein the organizational/group preferences are used as filter parameters for filtering the identified at least one color such that only colors that satisfy the organizational/group preferences are provided in the color recommendation.
Item 15. A data processing system comprising:
 a processor; and
 a memory in communication with the processor, the memory comprising executable instructions that, when executed by the processor, cause the data processing system to perform functions of:
  receiving a color recommendation request from a content editing application, the color recommendation request including color information pertaining to a document being edited by the content editing application;
   identifying at least one color based on at least one of a predefined accessibility standard, predetermined telemetry data, and organizational/group preferences with reference to the color information in the color recommendation request using a color recommendation service; and
   providing a color recommendation indicating the at least one identified color from the color recommendation service to the content editing application.
Item 16. The data processing system of any of claims 15, wherein identifying the at least one color includes identifying the least one color based on the predefined accessibility standard, and
 wherein the predefined accessibility standard includes a Web Content Accessibility Guideline (WCAG) standard.
Item 17. The data processing system of any of claims 15-16, wherein identifying the at least one color includes identifying the least one color based on the predetermined telemetry data,
 wherein the predetermined telemetry data includes user-specific telemetry data pertaining to past color choices made by a current user of the content editing application, and
 wherein the at least one color is identified using a color selection model trained to learn rules for identifying the at least one color for the color recommendation based on the user-specific telemetry data.
Item 18. The data processing system of any of claims 15-17, wherein identifying the at least one color includes identifying the least one color based on the predetermined telemetry data,
 wherein the predetermined telemetry data includes telemetry data pertaining to past color choices made by a plurality of users of content editing applications, and
 wherein the at least one color is identified using a color selection model trained to learn rules for identifying the at least one color for the color recommendation based on the telemetry data for the plurality of users.
Item 19. The data processing system of any of claims 15-18, further comprising:
 using the color recommendation in the content editing application to limit selectable colors for use in editing content in the document.
Item 20. The data processing system of any of claims 15-19, further comprising:
 automatically applying the at least one identified color in the color recommendation to at least one content element in the document.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
    a processor; and
    a memory in communication with the processor, the memory comprising executable instructions that, when executed by the processor, cause the data processing system to perform functions of:
    receiving a color recommendation request from a content editing application, the color recommendation request including color information pertaining to a document being edited by the content editing application;
    identifying at least one color using a color selection machine learning (ML) model pretrained to select the at least one color based on the color information in the color recommendation request, the color selection ML model being trained using training data based on telemetry data generated by at least one user of content editing applications, the telemetry data indicating color choices in different contexts made by the at least one user, the color selection ML model being trained to receive the color information as input and output the at least one color; and
    providing a color recommendation indicating the at least one color identified by the color selection ML model to the content editing application,
    wherein:
    the telemetry data includes user-specific telemetry data pertaining to past color choices made by users in interacting with content editing applications, and
    the color selection ML model is trained to learn rules for identifying the at least one color for the color recommendation based on the user-specific telemetry data.

2. The data processing system of claim 1, wherein the telemetry data includes telemetry data pertaining to past color choices made by a plurality of users of content editing applications, and
    wherein the color selection ML model is trained to learn rules for identifying the at least one color for the color recommendation based on the telemetry data for the plurality of users.

3. The data processing system of claim 1, further comprising:
    displaying via a user interface control which displays a plurality of colors which are supported by the content editing applications,
    wherein each color in the plurality of colors that is included in the color recommendation is displayed by the user interface control in a manner that indicates that the color is currently selectable and usable in the content editing applications, and
    wherein each color in the plurality of colors that is not included in the color recommendation is displayed by the user interface control in a manner that indicates that the color is not currently available for selection and is not currently usable in the content editing applications.

4. The data processing system of claim 1, further comprising:
    automatically applying the at least one color in the color recommendation to at least one content element in the document.

5. The data processing system of claim 1, further comprising:
    using organizational/group preferences as filter parameters to filter the at least one color such that only colors that satisfy the organizational/group preferences are provided in the color recommendation.

6. The data processing system of claim 1, further comprising:

identifying the at least one color such that the at least one color satisfies a preselected accessibility standard with respect to the color information from the color recommendation request.

7. A data processing system comprising:
a processor; and
a memory in communication with the processor, the memory comprising executable instructions that, when executed by the processor, cause the data processing system to perform functions of:
receiving a color recommendation request from a content editing application, the color recommendation request including color information pertaining to a document being edited by the content editing application;
identifying at least one color using a color selection model pretrained to select the at least one color using the color information as input and based on at least one of a predefined accessibility standard, predetermined telemetry data, and organizational/group preferences with reference to the color information in the color recommendation request using a color recommendation service; and
providing a color recommendation indicating the at least one identified color from the color recommendation service to the content editing application,
wherein:
identifying the at least one color includes identifying the at least one color based on the predetermined telemetry data,
the predetermined telemetry data includes user-specific telemetry data pertaining to past color choices made by users in interacting with content editing applications, and
the color selection model is trained to learn rules for identifying the at least one color for the color recommendation based on the user-specific telemetry data.

8. The data processing system of claim 7, wherein identifying the at least one color includes identifying the at least one color based on the predefined accessibility standard, and
wherein the predefined accessibility standard includes a Web Content Accessibility Guideline (WCAG) standard.

9. The data processing system of claim 7, wherein identifying the at least one color includes identifying the at least one color based on the predetermined telemetry data,
wherein the predetermined telemetry data includes telemetry data pertaining to past color choices made by a plurality of users of content editing applications, and
wherein the at least one color is identified using a color selection model trained to learn rules for identifying the at least one color for the color recommendation based on the telemetry data for the plurality of users.

10. The data processing system of claim 7, further comprising:
using the color recommendation in the content editing application to limit selectable colors for use in editing content in the document.

11. The data processing system of claim 7, further comprising:
automatically applying the at least one identified color in the color recommendation to at least one content element in the document.

12. The data processing system of claim 7, wherein identifying the at least one color includes identifying the at least one color based on the predetermined telemetry data, and
wherein the organizational/group preferences are used as filter parameters for filtering the at least one color such that only colors that satisfy the organizational/group preferences are provided in the color recommendation.

13. A data processing system comprising:
a processor; and
a memory in communication with the processor, the memory comprising executable instructions that, when executed by the processor, cause the data processing system to perform functions of:
receiving a color recommendation request from a content editing application, the color recommendation request including color information pertaining to a document being edited by the content editing application;
identifying at least one color based on at least one of a predefined accessibility standard, predetermined telemetry data, and organizational/group preferences with reference to the color information in the color recommendation request using a color recommendation service; and
providing a color recommendation indicating the at least one identified color from the color recommendation service to the content editing application,
wherein:
identifying the at least one color includes identifying the at least one color based on the predetermined telemetry data,
the predetermined telemetry data includes user-specific telemetry data pertaining to past color choices made by users in interacting with content editing applications, and
the at least one color is identified using a color selection model trained to learn rules for identifying the at least one color for the color recommendation based on the user-specific telemetry data.

14. The data processing system of claim 13, wherein identifying the at least one color includes identifying the at least one color based on the predefined accessibility standard, and
wherein the predefined accessibility standard includes a Web Content Accessibility Guideline (WCAG) standard.

15. The data processing system of claim 13, wherein identifying the at least one color includes identifying the at least one color based on the predetermined telemetry data,
wherein the predetermined telemetry data includes telemetry data pertaining to past color choices made by a plurality of users of content editing applications, and
wherein the at least one color is identified using a color selection model trained to learn rules for identifying the at least one color for the color recommendation based on the telemetry data for the plurality of users.

16. The data processing system of claim 13, further comprising:
using the color recommendation in the content editing application to limit selectable colors for use in editing content in the document.

17. The data processing system of claim 13, further comprising:

automatically applying the at least one identified color in the color recommendation to at least one content element in the document.

\* \* \* \* \*